Jan. 9, 1962     G. E. CONTRERAS ETAL     3,016,249

JOINT STRUCTURE

Filed April 29, 1959     2 Sheets-Sheet 1

GILBERT E. CONTRERAS
ROBERT W. GRAVES
INVENTORS

BY *Huebner & Worrel*

ATTORNEYS.

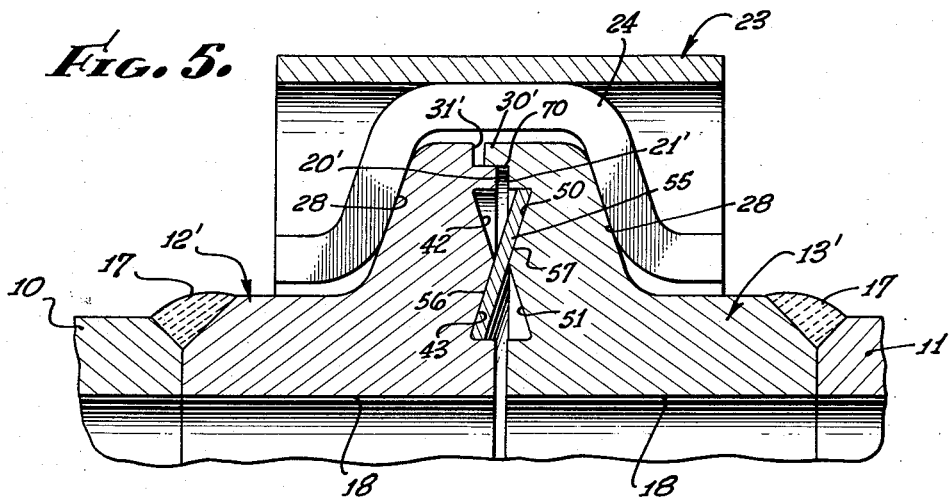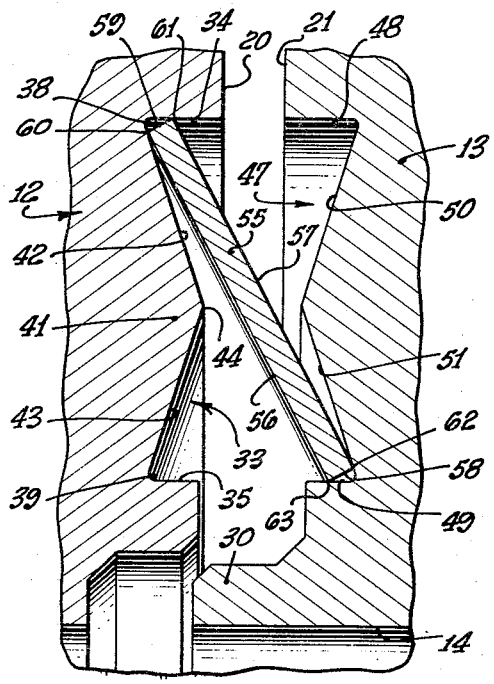

United States Patent Office 3,016,249
Patented Jan. 9, 1962

3,016,249
JOINT STRUCTURE
Gilbert E. Contreras, Los Angeles, and Robert W. Graves, Canoga Park, Calif., assignors to Aeroquip Corporation, Jackson, Mich., a corporation of Michigan
Filed Apr. 29, 1959, Ser. No. 809,768
4 Claims. (Cl. 285—336)

This invention relates to joint structures of the general type for interconnecting two members in a fluid containing or conveying system, at least one member having an opening formed therein for accommodating the fluid, the pair of members providing interfacing surfaces encircling said opening and receiving a frusto-conical gasket therebetween to form a tight seal for the joint.

Joint structures of this invention are especially advantageous when employed under conditions of relatively high temperatures and internal pressures, and under conditions in which the joint is subjected to flexing moments and to severe vibrations as are met with, for example, in aircraft.

It is a general object of this invention to provide an improved joint structure of the above mentioned character in which the interfacing joint surfaces are provided with annular recesses and annular shoulders for receiving a gasket of frusto-conical configuration therebetween and for supporting the gaskets in tight sealing engagement with the joint surfaces.

It is a specific object of this invention to provide a joint structure of the above mentioned character in which the interfacing joint surfaces will receive the frusto-conical gasket no matter in which direction the gasket may be placed by an operator before closing the joint, whereby it is practically impossible to assemble the joint incorrectly.

Further objects and advantages of the invention will become apparent during the course of the following part of this specification wherein the details of construction and mode of operation of two embodiments of the invention are described with reference to the accompanying drawing, in which:

FIG. 5 is a sectional view similar to that of FIG. 3, but showing a modified form for certain of the elements of the joint;

FIG. 6 is a fragmentary axial section on a greatly enlarged scale showing the joint parts in their relative position before closing of the joint; and FIG. 7 is a fragmentary axial section on a greatly enlarged scale showing the joint parts in their relative positions when closed.

Figure 1:
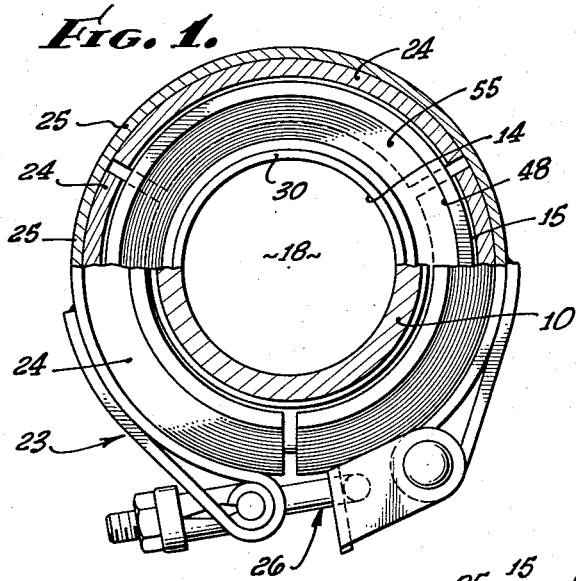
FIG. 1 is a view partly in side elevation and partly in cross section, of a pipe or tube joint embodying the invention.
Figure 2:
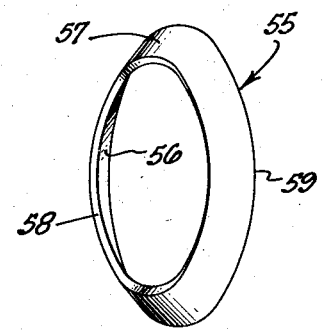
FIG. 2 is a perspective view of a gasket for the joint.

Referring to the drawing in greater detail, there is shown a joint structure of this invention as the same may be adapted for interconnecting and sealing the adjacent ends of two pipe sections 10 and 11 of a fluid system. The illustrated joint structure comprises annular flanges 12 and 13, each having inner and outer cylindrical surfaces 14 and 15, respectively, and having cylindrical skirts 16. The skirts 16 of the flanges of the illustrated embodiment have an inside diameter equal to that of the pipe sections and the flanges are joined to the respective pipe sections by welding as at 17. It will be understood, of course, that the illustrated form for securing the flanges on the ends of the pipe sections is a preferred arrangement, and that they may be secured otherwise, as, for example, the skirt portions of the flange members may be made to fit as collars around or within the ends of the pipe sections. Also, it is to be understood that though the invention is herein described as it may be adapted for interconnecting the ends of two axially aligned pipe sections, the members 12 and 13 may be elements of a fluid containing or conveying device such as a pump, for example, wherein the members 12 and 13, instead of being of outwardly extending flange-type construction, may be of any shape having openings 18 extending therein defined by the inside walls 14. Then, too, the joint structure of this invention may be employed to attach a cap or an end plate on a conduit or other device, whereby one member of the joint structure, i.e. a cap, for example, may not have an opening extending therein nor therethrough while the other member of the joint structure, i.e. a wall of such device will have an opening or recess formed therein or an opening extending therethrough.

The flanges 12 and 13 have opposed annular joint surfaces 20 and 21, respectively, circumscribing the central openings 18 of the flanges. The flanges may be drawn toward each other by any suitable means, the illustrated form for doing that being a coupling, designated generally by reference numeral 23. Coupling 23 comprises a plurality of arcuate jaw segments 24 of V-channel section which are spot welded or otherwise suitably attached to a constrictor band 25 having take-up latch means 26 for radially constricting or shortening the band circumferentially around the flanges. The flanges extend into the V-channel segments. The outside walls 28 of the flanges are frusto-conical and of a slant corresponding to that of the inside walls of the jaw segments, whereby as the latch means 26 is tightened, the jaw segments will exert a wedging action against the flanges to draw or force them axially toward each other.

For piloting the flanges during assembly of the joint parts to couple the flanges, flange 13 is provided with an axially projecting annular tenon 30 along the inner periphery thereof, and flange 12 is provided with an annular rabbet or mortise 31 for accommodating the tenon 30. In the embodiment shown in FIG. 5, the mortise and tenon piloting structure is located along the outer peripheries of the flanges, the tenon in FIG. 5 being designated by reference numeral 30′ and its mating mortise by numeral 31′.

Flange 12 has an annular recess or groove 33 formed therein extending axially inwardly from annular surface 20 and being arranged coaxially of the flange. The groove 33 is defined by an outside annular shoulder 34 and inside annular shoulder 35 and a bottom wall 36. The shoulders constitute tubular wall surfaces which are coaxial with respect to each other and extend coaxially of the flange openings 18. In the illustrated embodiment the shoulders 34 and 35 are cylindrical and circular in cross section. The inner ends of the outer and inner shoulders are designated by reference numerals 38 and 39, respectively, they being at the corners or apexes along which the bottom wall meets the shoulders 34 and 35. Such apexes or inner ends of the shoulders are disposed in a common plane which passes through the flange perpendicular to the axis of the flange.

For purposes which will appear hereinafter, the bottom wall 36 of the recess projects out beyond the plane of the groove apexes or inner edges 38 and 39. In the illustrated embodiment such projection of the bottom wall is designated by reference numeral 41 and is so shaped as to provide two frusto-conical surface portions 42 and 43, respectively. Surface portion 42 slants out from inner end 38 of outer shoulder 34 to a circular edge 44 substantially midway between the shoulders 34 and 35, and it faces in a direction slightly outwardly from the flange axis. The other frusto-conical surface portion 43 of the bottom wall slants out from inner end 39 of inner shoulder 35 to the circular edge 44 and it faces in a direction slightly inwardly toward the flange axis. The corners or apexes (end edges 38 and 39) along which the frusto-conical surface portions of the bottom wall meet the respective cylindrical shoulders 34 and 35 are rounded.

Flange 13 has an annular recess or groove 47 which is identical in size and configuration to the groove 33 of the flange 12. The wall portions which define the groove 47 are numbered as follows: outer cylindrical shoulder 48, inner cylindrical shoulder 49, and frusto-conical surface portions 50 and 51, respectively.

The gasket for the joint is designated generally by reference numeral 55. It is received in the annular grooves 33 and 47 of the flanges. The gasket is formed of a material (e.g. aluminum, copper, and alloys thereof) softer than that, e.g. stainless steel, from which the flanges may be formed. The flanges and the gasket may be formed of the same metal, e.g. stainless steel, and in such cases the gasket is preferably annealed to make it softer than the flanges.

The gasket is frusto-conical, having inner and outer side surfaces 56 and 57, respectively, and inner and outer end surfaces 58 and 59, respectively. In the illustrated embodiment the gasket is rectangular in radial section. The corners or annular meeting edges of the side and end surfaces of the gasket are designated by numerals 60, 61, 62, and 63, respectively, as shown in FIG. 6 of the drawing.

Figure 4:
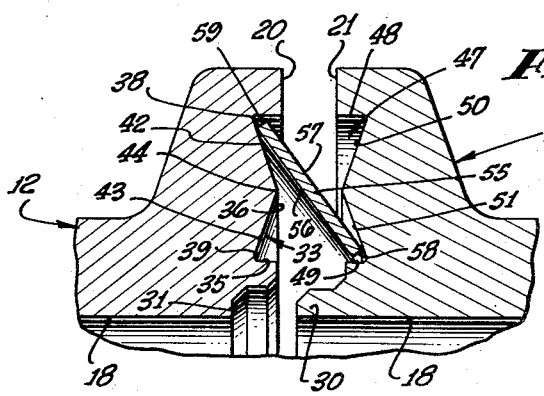
FIG. 4 is a sectional view corresponding to that of FIG. 3, but showing only the joint members and the gasket in their relative positions before interengagement of the parts.

As appears best in FIG. 4, the slant or angle of inclination of the gasket in respect to a plane normal to the axis of the gasket is greater than that of the frusto-conical surface portions of the recesses 33 and 47. Thus, when the gasket is placed between the flanges before pressure is applied to the flanges to draw them toward each other, the circular edge 60 of the gasket contacts the bottom wall of the recess of flange 12 and the circular edge 62 contacts the bottom wall of the recess of flange 13.

The gasket and the flanges are so constructed that when the joint is made tight, as with the coupling 23, the gasket will have become stressed to a condition in which its degree of slant is substantially less than that of its unstressed condition, and two fluid-tight seals will be formed in the groove apexes against the outer cylindrical shoulder of the annular groove of one flange and the inner cylindrical shoulder of the annular groove of the other flange. As the gasket is stressed from the position thereof shown in FIG. 6 to the closed position of FIG. 7, the edges or corners 60 and 61 of the outer end surface of the gasket become coined by engagement with shoulder 34 and the frusto-conical surface portion 42 such that the metal in these corner portions is caused to flow to substantially fill the space in the curved apex 38 of groove 33. Similarly, the inner edges or corners 63 and 62 of the end surface of smaller diameter of the gasket become coined by the shoulder 49 and frusto-conical surface portions 51 of the groove 47 in flange 13.

There is a practical minimum limit for the angle of slant of the gasket when in its stressed or sealing position. Should such angle be less than about seven degrees, the flanges may not without great difficulty be separated when it is desired to disconnect the pipe sections. Disengagement of the gasket from the flanges can be effected easily when desired in joints in which the slant of the gasket in its sealing position is about ten degrees.

The projecting bottom wall portions 41 of the gasket receiving grooves serve to support the gasket as the gasket is being subjected to radial pressure which causes its end surfaces to become coined in the apexes of the grooves, thereby to prevent buckling of the gasket. The angle of slant or inclination of the frusto-conical surface portions of the bottom walls of the grooves are inclined to an angle (taken with respect to a perpendicular plane through the axis of the flanges), equal to the angle of slant of the gasket in its sealing position. Of course, the longer the radial extent of the frusto-conical surface portions, the greater will be the amount of support afforded to the gasket.

An important feature of this invention is that the flange grooves will receive the frusto-conical gasket no matter in which direction the gasket may be placed in the grooves by one who is installing the joint. Thus, in FIG. 5 the gasket is shown in a position which is reversed from that shown in the remaining figures of the drawing. The joint structure of this invention is not susceptible to being improperly assembled by an inattentive operator for no matter in which direction the gasket may be placed, it will become sealed properly.

Figure 3:
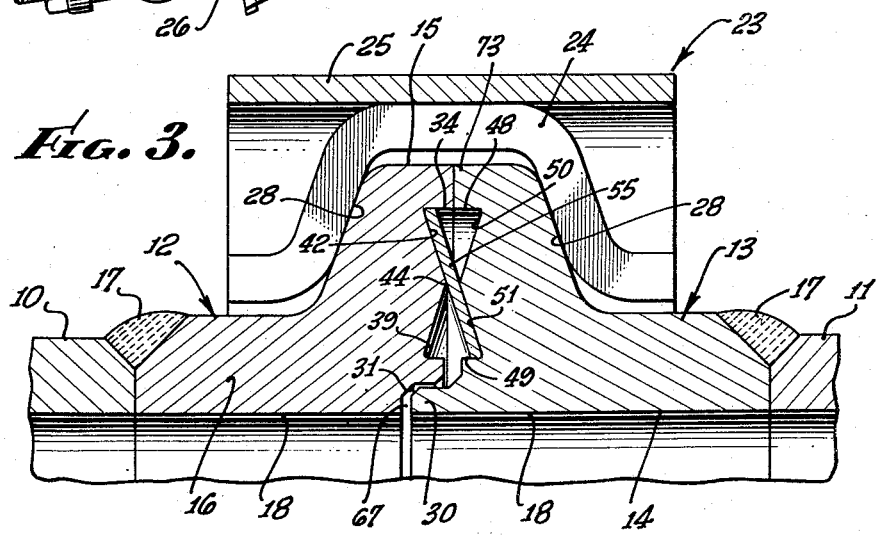
FIG. 3 is a fragmentary axial section on an enlarged scale through the joint.

It should be noted further that the flanges are so dimensioned that no parts thereof other than the gasket and the walls of the annular grooves sustain any of the force exerted by the coupling 23. Thus, the piloting tenon and mortise parts 30 and 31 are made loose with respect to each other so that when the joint is closed, the tenon will be spaced as at 67 (FIG. 3) from the walls which define the mortise 31. Also, the outside portions of the surfaces 20' and 21' of the flanges 12' and 13' may be spaced slightly apart as at 70 in FIG. 5 when the gasket is stressed to joint-closed position. In the embodiment shown in FIGS. 3 and 7, the surface 20 on flange 12 just about touches the surface 21 of flange 13 in the outer marginal portions 73 of the flanges when the joint is closed. For the embodiment of FIGS. 3 and 7, more careful machining is required to ensure that the surfaces of the flanges do not become abutted such as to prevent maximum pressure being exerted upon the gasket.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What we claim is:

1. A joint structure comprising two members, each having an opening formed therein for accommodating a fluid and each having an annular joint surface circumscribing its opening, means for applying pressure on the members for drawing them toward each other with the joint surface of one member facing toward the joint surface of the other member and with said openings being substantially in axial alignment, each of said joint surfaces having an annular groove formed therein and defined by outside and inside shoulders and a bottom wall extending between said side shoulders, the shoulders being tubular walls and coaxial with respect to each other and substantially coaxial of said openings and extending into their respective members from said joint surfaces to a common plane perpendicular to the axis of said openings, the bottom wall projecting in a direction axially outwardly from said plane as two frusto-conical surface portions, the slant of each of said frusto-conical surface portions with respect to said plane being equal, and a gasket having inner and outer frusto-conical side surfaces and an annular outer end surface defining the outer circumferences of said side surfaces, and an annular inner end surface defining the inner circumferences of said side surfaces, the gasket being receivable and adapted to be stressed in said grooves with the outside edge of said outer end surface being in circular contact with the outside shoulder of one member and with the inside edge of said inner end surface being in circular contact with the inside shoulder of the other member, and with one side surface of the gasket being in contact with a frusto-conical surface portion of the groove of one member, and with the other side surface of the gasket being in contact with a frusto-conical surface portion of the groove of the other member.

2. A joint structure according to claim 1, in which the frusto-conical surface portions of each groove are equal to each other in radial extent.

3. A joint structure according to claim 1, in which the frusto-conical surface portions of each groove meet along a circular line midway between said outside and inside shoulders.

4. A joint structure according to claim 1, in which said gasket is formed of metal softer than that from which said members are formed, and the gasket being adapted to be coined in said end surfaces thereof by said side shoulders.

References Cited in the file of this patent

UNITED STATES PATENTS

| 1,799,834 | Waterman | Apr. 7, 1931 |
| 1,965,273 | Wilson | July 3, 1934 |
| 2,703,722 | Christophersen | Mar. 8, 1955 |
| 2,757,945 | Bingham | Aug. 7, 1956 |

FOREIGN PATENTS

| 538,517 | Great Britain | Aug. 7, 1941 |